May 18, 1965  E. L. RULE  3,184,365
APPARATUS FOR MANUFACTURING HONEYCOMB
Filed Nov. 14, 1961  2 Sheets-Sheet 1
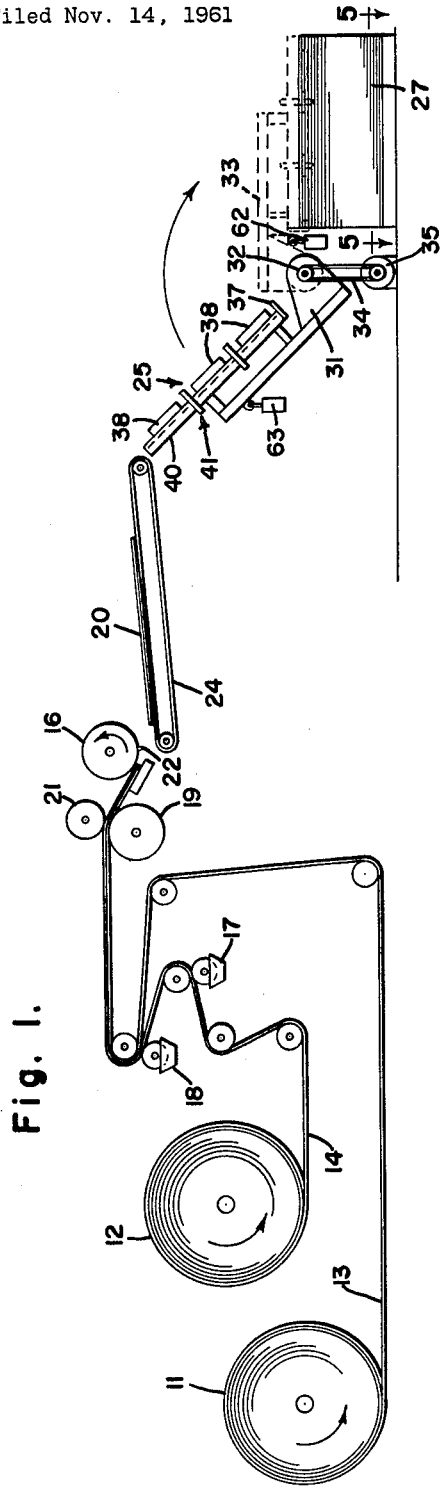
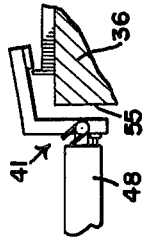
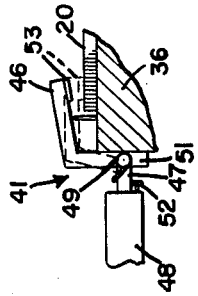
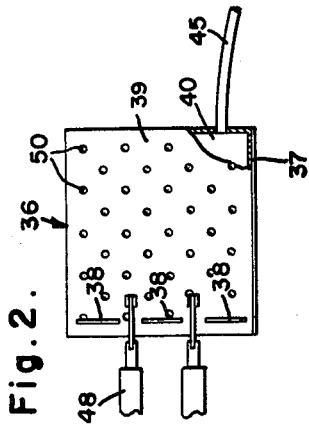
INVENTOR.
Edwin L. Rule
BY
Townsend and Townsend
attorneys

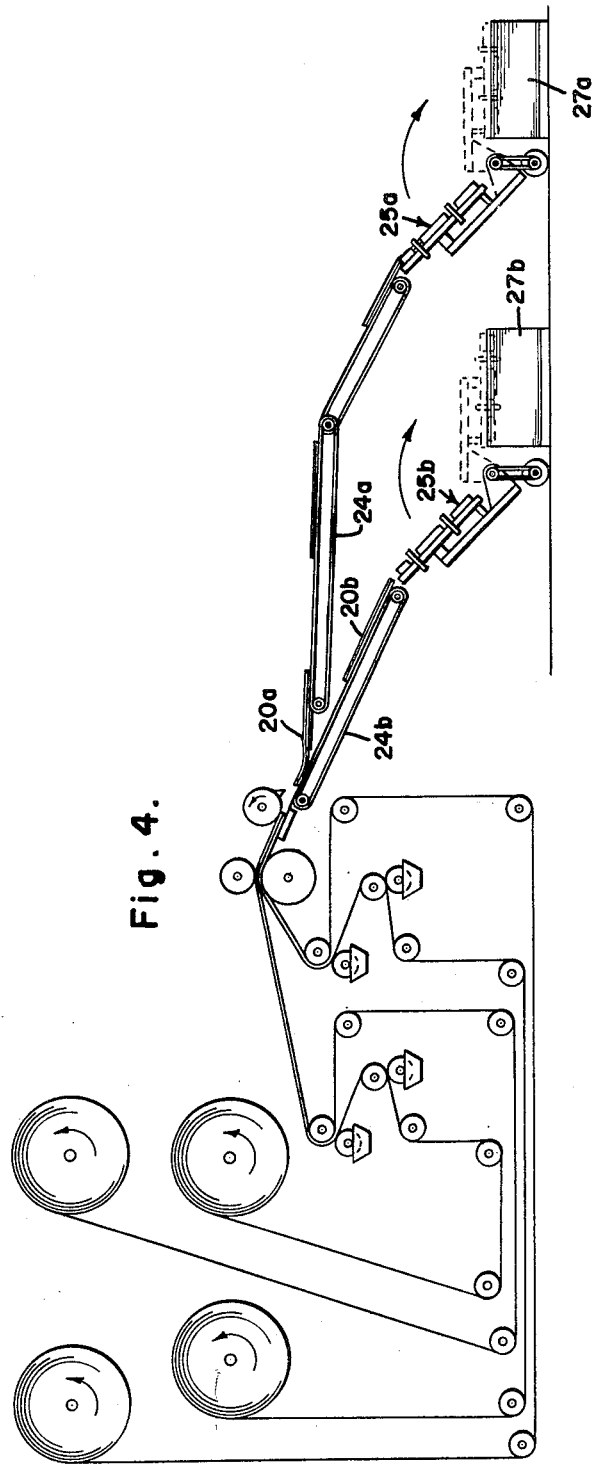
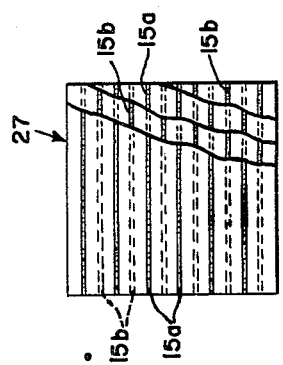

United States Patent Office 3,184,365
Patented May 18, 1965

3,184,365
APPARATUS FOR MANUFACTURING
HONEYCOMB
Edwin L. Rule, Berkeley, Calif., assignor to Hexcel Products Inc., Berkeley, Calif., a corporation of California
Filed Nov. 14, 1961, Ser. No. 152,350
9 Claims. (Cl. 156—548)

This invention relates to the art of making honeycomb and more particularly to an improved apparatus for forming an unexpanded stack of honeycomb.

For many applications a stack of unexpanded honeycomb is formed by applying staggered lines of glue to continuous sheets of material, joining two or more together to form a continuous composite sheet, cutting composite sheets of preselected size, and stacking the composite sheets so that each one adheres to the adjacent sheet. One of the continuing problems in forming these blocks of unexpanded honeycomb is to accurately align or register the edges of the cut sheets of material to assure honeycomb cells of accurate and uniform dimensions.

The principal object of the present invention, therefore, is to produce an unexpanded honeycomb block wherein the edges are accurately registered.

In accordance with this object, the present invention provides means for applying spaced apart longitudinal lines of adhesive to opposite sides of one of two continuous sheets of material, joining the continuous sheets of material, cutting the composite sheets into preselected lengths and stacking these cut sheets on top of each other in registered alignment.

A principal feature of the invention pertains to the means for registering the edges of a sheet with the edges of the block to insure uniformity of size and orientation of the cellular openings.

Another feature pertains to the inverting means for translating the sheets from the cutting means to the block of unexpanded honeycomb.

These and other objects and features of the invention may be more fully understood when the following detailed description is read with reference to the drawings in which:

FIG. 1 is a schematic representation of apparatus for continuously and automatically forming a stack of unexpanded honeycomb in accordance with the present invention;

FIG. 2 is a plan view of the pivotally supported inverter which accurately aligns a composite sheet preparatory to depositing it on the block of unexpanded honeycomb;

FIG. 3a is a partial cross section of the apparatus for displacing the cut sheets toward registry guides at one side of the inverter platen;

FIG. 3b is a partial cross section of the registering apparatus of FIG. 3a after the apparatus has registered a composite sheet against one of the guides;

FIG. 4 is a schematic representation of a continuous process in accordance with the present invention wherein pairs of continuous composite sheets are cut in selected lengths and alternate ones are stacked to form two blocks of unexpanded honeycomb, and FIG. 5 is a section taken along line 5—5 of FIG. 1 with parts of some of the composite sheets broken away to show the construction of the unexpanded block of honeycomb.

Looking to the exemplary apparatus of FIG. 1, rolls of material 11 and 12 are rotatably supported and the continuous sheets or webs thereon 13 and 14 directed through supporting and drive rollers to a point adjacent the rotary or shear cutter 16. The web 14 is passed adjacent adhesive sources 17 and 18 which respectively place wet lines of glue 15a and 15b on the reverse and obverse sides respectively of web 14 at staggered spaced apart points. Sheet or web 13 is forced into contact with sheet 14 adjacent glue applicator 18 which causes the obverse side of sheet 13 to adhere to the spaced apart glue lines on the reverse side of sheet 14.

The continuous sheets or webs thereafter pass over a support roller 19 which cooperates with a notched or serrated drive roller 21 to move the sheets past the shear 16. The guide roller 21 is of a preselected diameter and notched at transversely spaced apart points along its periphery to prevent its contacting the longitudinal lines of wet glue previously applied to the obverse side of sheet 14 by glue source 18.

The diameter of cutter 16 is proportioned to allow blade 22 to cut preselected lengths of the composite sheet of 13 and 14, identified as 20, as it moves past the cutter 16. Each cut length of overlying sheets 13 and 14 is transferred by the belt conveyor 24 to the inverter apparatus 25.

Inverter apparatus 25 is pivotally supported to successively transfer cut lengths of the composite sheets to the top of the unexpanded stack or block of honeycomb 27 (see FIG. 5). As each composite sheet is deposited on the block, the obverse side of sheet 13 by way of the glue lines formed thereon adheres to the reverse side of sheet 14 facing upward on the block 27.

More particularly, the inverter apparatus 25 includes a frame 31 pivotally supported about an axle 32 for movement between a retracted position shown in full line in FIG. 1 and an operative or overlying position shown by dotted line 33 in FIG. 1. The rotation of inverter frame 31 is controlled by a motor or other rotating device 35 through belt 34.

The frame 31 has fixedly connected to its upper surface (with respect to the top of the apparatus depicted in FIG. 1) a rectangular bed or platen 36 with an upstanding guide or retainer edge 37 on its lower or abscissa side against which the forwardmost edge of the cut lengths of each composite sheet 20 rests as the sheet is deposited on the platen 36. Additionally, the platen 36 includes a series of upstanding transverse or ordinate guides 38 which are mounted to the left of and at right angles to retainer edge 37. Cooperating with the coplanar guides 38 are aligning devices 41 which are operable to engage a composite sheet and move its left edge against the coplanar guides 38 thus assuring that the composite sheet when inverted and placed on stack 27 registers with previous sheets to assure a uniform honeycomb when the unexpanded stack 27 is thereafter expanded.

As shown particularly in FIG. 2, the inverter platen 36 is hollow as defined by its four sides and spaced top and bottom plates 39 and 40. The hollow interior defines a pressure chamber connected to a suitable air source (not shown) by a flexible conduit such as indicated at 45. The top plate 39 of platen 36 is formed with spaced apertures 50 communicating to the pressure chamber. It is seen that each sheet 20 of paper or other material fed from the conveyor 24 onto the platen will lie flat on the platen surface due to the movement of the inverter from its receiving to stacking positions as shown in the drawings. When the inverter overlies stack 27, a microswitch such as 62 can be actuated by frame 31 (see dotted line position of FIG. 1) to introduce positive air pressure by way of hose 45 so that the composite sheet will move onto the stack 27 and not adhere to the platen surface. Further, another switch 63 can be actuated by frame 31 when the frame reaches its fully retracted position (solid line position of FIG. 1) to disconnect hose 45 from the source so that the next composite sheet from belt conveyor 24 lies flat on platen 36.

Looking more particularly to the aligning devices 41, which cooperate to slide composite sheets 20 against guide edges 38 after the lowest edge of a sheet 20 rests against guide edge 37, each can be seen to include an L-shaped arm 46 pivotally connected at one leg thereof to the armature 47 of a solenoid or similar operating device 48. The L-shaped arm 46 is pivotally urged by spring 49 to assume a downward position pressing against the composite sheet 20 as illustrated by the dotted line position thereof in FIG. 3a. As the frame 31 moves toward its overlying position as indicated by the direction of the arrow in FIG. 1, the solenoid 48 is energized and the armature 47 moves the L-shaped arm 46 away from platen 36. As this occurs, the spring 49 causes L-shaped arm 46 to contact the unglued edge margin of the upper surface of composite sheet 20 and pull it across the surface of platen 36 to a position abutting the guide edge 38. As the solenoid continues to withdraw the L-shaped arm 46, the lower end 51 of the arm contacts the stop 52 on the body of the solenoid 48 to pivot the contacting end 53 of the arm 46 upwardly out of contact with composite sheet 20.

At this point the frame 31 has been fully pivoted to a position overlying the stack of unexpanded honeycomb 27 and the air means is enabled to force composite sheet 20 to drop onto the top of block 27. The initiation of the operation of the aligning device is illustrated in FIG. 3a and its position after the frame 31 is pivoted to a position overlying the stack 27 is shown in FIG. 3b. As the frame 31 moves towards its retracted position, where its upper edge is adjacent the end of belt conveyor 24, the solenoid 48 is de-energized and the lower leg of L-shaped arm 46 engages the side 55 of platen 36 to pivot the upper end having surface 53 thereon away from the top of platen 36 so that the next composite sheet 20 may be deposited on the platen 36 for inverted stacking on the unexpanded honeycomb stack 27.

The present invention can be seen to provide a simple and straightforward means by which the sides of a stack of unexpanded honeycomb are accurately registered on a continuous basis. One disadvantage of the process described above arises because of the delay increment during which the inverter apparatus 25 is moving from its retracted to open position and back. In order to avoid the time lag, it is possible to enlarge the capacity of the apparatus as illustrated in FIG. 4. In the alternative embodiment illustrated, two process lines for two sheets of materials cooperate to provide a four layer composite sheet 20a and 20b. Sheets of this composite material 20a and 20b are alternately fed to belt conveyors 24a and 24b which cooperate with separate translating devices 25a and 25b. These separate process lines are identified with similar numbers as those illustrated in FIG. 1 except for the suffixes a and b to simplify the comparison of the apparatus. The advantage of the dual process line of FIG. 4 is that the capacity may be doubled because one inverter apparatus, for example 25a, can be transferring a sheet from belt conveyor 24a to stack 27a while the next composite sheet 20b is being moved towards inverter apparatus 25b by conveyor belt 24b. By alternately disabling the air systems associated with belt conveyors 24a and 24b, it is possible to direct composite sheets 20a and 20b alternately to their proper process lines. The result of the foregoing is to produce two stacks of unexpanded honeycomb 27a and 27b in approximately the same time required to produce a single stack in accordance with the apparatus of FIG. 1.

Solenoid operation of the device for registering the ordinate of the sheets 20 is only one way to obtain the desired result. For contrast, a cam and cam follower arrangement might be integrated with the movement of frame 31 between its retracted and operated positions to secure the same sequence of operations. Similarly, switches 62 and 63 are but one way to control the air pressure in the air chamber in platen 36; other means and/or techniques can be envisioned.

While this invention has been described with reference to specific embodiments, it should be apparent to those skilled in the art that other variations are possible without departing from the scope of the invention. For this reason the invention should be limited only to the extent of the appended claims.

What is claimed is:

1. Apparatus for aligning the edges of cut sheets of materials to register with the sides of a stack constituting an unexpanded block of honeycomb comprising, in combination, an inverting device supported for movement between a retracted position and a position overlying a block of unexpanded honeycomb, means to move said inverting device between said positions, first guide means associated with said device to expect registry of one edge of a precut length of said material after it is deposited on said device, second guide means associated with said device angularly oriented with respect to said first guide means, and sheet engaging means operable as said inverting device moves from the retracted to said overlying position for engaging the cut sheet after it registers against said first guide means to move it transversely against said second guide means thereby to assure accurate registry of the cut sheet edges and the block edges after the cut sheet is deposited on the unexpanded block of honeycomb.

2. Apparatus for aligning the edges of cut sheets of materials to register with the sides of a stack constituting an unexpanded block of honeycomb comprising, in combination, an inverting device supported for arcuate movement between a retracted position and a position overlying a block of unexpanded honeycomb, means operable to move said inverting device between said positions at selected times, a first guide affixed to said inverting device to engage one edge of a precut length of said material under the influence of gravity after it is deposited on said device, a second guide affixed to said device angularly oriented with respect to said first guide, and sheet engaging means operable as said inverting device moves from the retracted to said overlying position and after the sheet registers against said first guide for positively moving the sheet against said second guide thereby to assure accurate registry of the cut sheet edges and the block edges after the cut sheet is deposited on the unexpanded block of honeycomb.

3. Apparatus in accordance with claim 2 wherein the sheets of material are substantially rectangular in cross section, the guides are at substantially right angles to each other and said sheet engaging means is disabled when said inverting device is moved from said overlying position to said retracted position.

4. Apparatus for aligning the edges of cut sheets of materials to register with the sides of a stack constituting an unexpanded block of honeycomb comprising, in combination, an inverting device supported for pivotal movement between a retracted position and an inverted position overlying a block of unexpanded honeycomb, means to move said inverting device between said positions, first guide means associated with said device to permit registry of one edge of a precut length of said material after it is deposited on said device, second guide means associated with said device angularly oriented with respect to said first guide means, sheet engaging means operable as said inverting device moves from the retracted to said overlying position for engaging the cut sheet after it registers against said first guide means to move it against said second guide means thereby to assure accurate registry of the cut sheet edges and the block edges after the cut sheet is deposited on the unexpanded block of honeycomb, and displacement means cooperating with said inverting device operable to break each sheet away therefrom after the device is in said overlying position to discharge the sheet onto the stack.

5. Apparatus for inverting cut sheets of materials and aligning their edges to register with the sides of a stack constituting an unexpanded block of honeycomb comprising, in combination, a flat bed inverting device supported for arcuate inverted movement between a retracted position and a position overlying a block of unexpanded honeycomb, means for pivotally moving said inverting device between said positions at selected times, pressure means operable to displace said precut lengths of material from said inverting device after said device reaches said overlying position, a first guide affixed to said device to engage one edge of a precut length of said material under the influence of gravity after the material is deposited on said device, a second guide affixed to said device angularly oriented with respect to said first guide, and material engaging means operable as said device moves from the retracted to said overlying position for engaging the cut sheet after it registers against said first guide to positively move the cut sheet against said second guide thereby to register accurately the cut sheet edges and the block edges after the cut sheet is deposited on the unexpanded block of honeycomb from said inverting device.

6. Apparatus in accordance with claim 5 wherein said inverting device includes a hollow inverter platen defining a pressure chamber and wherein said platen includes an apertured top plate attached to the open side of the pressure chamber whereby application of pressure to said chamber deposits the cut sheet onto said stack.

7. Apparatus for making an unexpanded honeycomb stack from a plurality of sheets of material comprising means defining a generally horizontal surface, an inverting device mounted adjacent said surface for pivotal movement between a retracted position and an inverted position overlying said surface, means for serially feeding to said inverting device when in the retracted position individual sheets of material having lines of adhesive on only the obverse surface thereof so that the reverse side of the material contacts said inverting device, a stop for arresting movement of the sheet from said feeding means at a fixed point on said inverting device, means on said device for transversely positioning said sheet in a preselected transverse position on said device, means for moving said inverting device to the inverted position, and means for discharging the material from said inverting device onto said surface.

8. Apparatus according to claim 7 wherein said transverse positioning means comprises a guide projecting from said inverting device and disposed laterally of the path of movement of said sheet from said feeding means to said inverting device, and means for laterally moving a sheet on said inverting device into contact with said guide prior to discharge of the sheet onto said surface.

9. Apparatus for making an unexpanded honeycomb stack from a plurality of sheets having spaced apart glue lines on the obverse surface thereof comprising means for serially transporting the sheets serially along a path, an inverting device disposed in said path for receiving sheets from said sheet transporting means with the reverse surface of the sheet in contact therewith, a stack receiving table, means for pivotally moving said inverting device between a retracted position at which the inverting device is in sheet receiving relation to said transporting means and an inverted position at which the inverting device overlies said table, means on said inverting device and within the path of sheet movement for arresting the movement of said sheet on said inverting device, means on said inverting device for positioning each sheet at a preselected location transversely of said path, and means responsive to arrival of said inverting device at said inverted position for discharging a sheet from said inverting device onto said table.

References Cited by the Examiner

UNITED STATES PATENTS

| 1,924,472 | 8/33 | Thomson | 156—197 |
| 2,734,843 | 2/56 | Steele | 156—197 |
| 2,926,808 | 3/60 | Long | 156—572 |
| 2,973,294 | 2/61 | McClelland | 156—197 |

FOREIGN PATENTS

| 832,763 | 4/60 | Great Britain. |

EARL M. BERGERT, *Primary Examiner.*